Sept. 20, 1949.    R. J. McKENZIE ET AL    2,482,734
APPARATUS FOR ANNEALING COMPOSITE GLASS ARTICLES
Filed March 3, 1945

RONALD J. McKENZIE
ADDISON B. SCHOLES
STANLEY E. LULL    INVENTORS

BY
Lawrence Burns,
ATTORNEY

Patented Sept. 20, 1949

2,482,734

UNITED STATES PATENT OFFICE 2,482,734

APPARATUS FOR ANNEALING COMPOSITE GLASS ARTICLES

Ronald J. McKenzie and Addison B. Scholes, Danvers, and Stanley E. Lull, Salem, Mass., assignors to Sylvania Electric Products Inc., Salem, Mass., a corporation of Massachusetts Application March 3, 1945, Serial No. 580,770

2 Claims. (Cl. 49—47)

This invention relates to heating or annealing articles by induction, and particularly to heating or annealing composite articles, such as articles containing both metal and glass, and to retarding the cooling of parts of the composite article.

The invention is especially useful for annealing a seal between glass and metal, and particularly between a disc or wafer of glass with a metal flange or rim. In such articles, after the seal is made, the metal tends to cool faster than the glass, causing strains in the latter. The present invention retards the cooling of the metal rim, and provides a sealed piece free from undesirable strains. The rim is heated by radio frequency induction to achieve this result.

The article to be annealed may be carried through an annealing enclosure by a conveyor, and a radio frequency conductor placed along each side of its path of travel.

Figure 1:
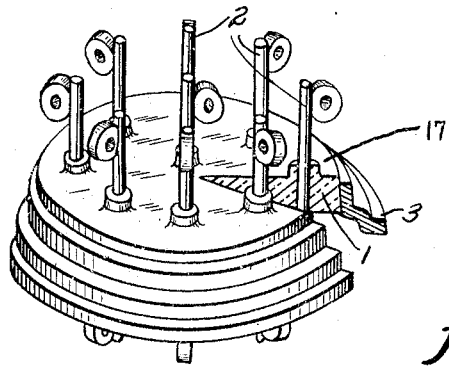
Figure 1 shows an article such as we have annealed according to the invention.

In Figure 1, the glass wafer 1 has sealed therethrough several metal lead-in wires 2 and has the annealer metal ring 3 sealed around its circumference. The sealing may be done by methods known in the art, for example by molding the wafer from glass rings as shown in U. S. Patent 2,342,609, issued February 22, 1944, to Bennett S. Ellefson. When the sealing or molding of the glass and metal parts together is finished, the piece is still hot and must be annealed properly to prevent the introduction of undesirable strains on cooling. If the piece is placed in an ordinary annealer, the glass will cool slowly, being of considerable mass and heat retentivity, while the thin metal will cool quickly. We find that the metal rim can be heated to a desirable temperature by radio frequency induction while in the annealer, without greatly affecting the temperature of the glass, which is non-conducting and hence unheated by induction.

Figure 2:
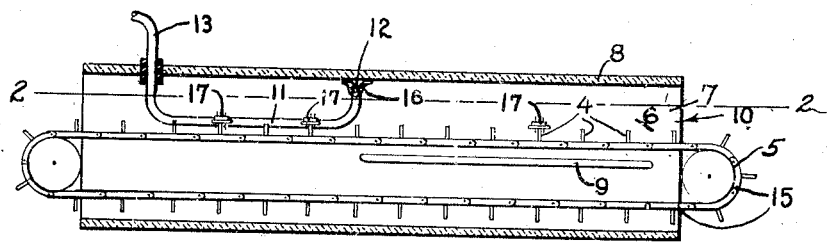
Figure 2 shows a vertical section through an annealer according to the invention taken along the line 3—3 of Figure 3.
Figure 3:
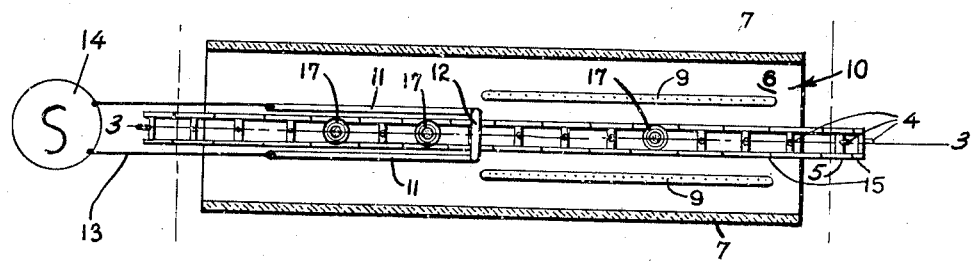
Figure 3 shows a horizontal section through the same annealer taken along the line 2—2 of Figure 2.

For example, as shown in Figures 2 and 3, the pieces to be annealed can be taken directly from whatever sealing mechanism be used, and placed on the supports 4, attached to conveyor 5, and carried into the refractory enclosure 6 formed by the walls 7 and ceiling 8. The piece may be quite hot at first, so to anneal it slowly the heaters 9, which may be flames from gas jets at each side of the enclosure 6 at its input end 10. This initial heating in the enclosure may best be sufficient to wipe out any strains present from the sealing operation or other past history of the piece. After passing through this heated space, the piece will begin to cool, the metal rim having a tendency to cool much more quickly than the glass. But the parallel radio frequency conductors 11, 11 forming a loop in conjunction with its end piece 12 and the connection 13 back to the radio frequency oscillator or generator 14, shown schematically, will retard the cooling of the metal rim. The end piece 12 may be supported by the insulator 16, attached to the ceiling 8, and the connection 13 may pass through insulating bushings in the ceiling 8, being insulated also outside the enclosure to prevent accidental contact with persons working near the device.

The conveyor may conveniently be an endless chain of refractory metal links 15, in which case the supports 4 should be long enough to space the charge sufficiently from the plane of the radio frequency conductors to avoid excessive losses due to currents induced in the chain.

The length of the radio frequency conductors is made short enough so that when the glass has finally cooled sufficiently, the radio frequency heating is removed and the metal cools also. The metal used should have a coefficient of expansion somewhat near that of the glass, but preferably slightly different in the direction such that when the whole piece has cooled the metal rim contracts somewhat to produce a slight compression stress on the glass. The lead-in wires 3 should have substantially the same coefficient of expansion as the glass.

The radio frequency conductors 11, 11 are in substantially the same plane as that in which the pieces are carried, to achieve a desirable inductive effect. The conductors should be close to the pieces 17, but spaced enough therefrom to insure sufficient uniformity of field through the metal to prevent too great a variation in heating thereof. For a piece about 1¼ inches diameter, I have found a spacing of 1 inch from center of piece to center of conductor to be satisfactory, the conductor itself being ¼ inch in diameter.

What we claim is:

1. In an annealer for composite glass and metal articles: a refractory enclosure; a conveyor for carrying said articles through said enclosure; gas burners in said enclosure near the entrance thereof; and a radio frequency loop in said enclosure near the exit thereof, said burners and said loop being disposed parallel to but spaced from the path along which said articles are carried by said conveyor.

2. In an annealer for composite glass and metal articles: a refractory enclosure; a conveyor for carrying said articles through said enclosure; gas burners in said enclosure near the entrance thereof; and a radio frequency loop in said enclosure near the exit thereof, said burners and said loop being disposed parallel to but spaced from the path along which said articles are carried by said conveyor, and disposed in substantially the same horizontal plane as the plane of the articles as they are carried through the refractory enclosure by the conveyor.

RONALD J. McKENZIE.
ADDISON B. SCHOLES.
STANLEY E. LULL.

REFERENCES CITED

The following references are of record in the file of this patent:

UNITED STATES PATENTS

| Number | Name | Date |
| --- | --- | --- |
| 1,566,500 | Northrup | Dec. 22, 1925 |
| 1,899,640 | Schwalbe | Feb. 28, 1933 |
| 2,301,940 | Fries | Nov. 17, 1942 |
| 2,308,240 | Goodridge | Jan. 12, 1943 |
| 2,328,225 | Morey | Aug. 31, 1943 |